US 12,083,824 B2

(12) United States Patent
Tsai (10) Patent No.: US 12,083,824 B2
(45) Date of Patent: Sep. 10, 2024

(54) CASTER WITH A BREAKING UNIT (71) Applicant: JENP-JOU ENTERPRISE CO., LTD., Tainan (TW)

(72) Inventor: Po-Chuan Tsai, Tainan (TW)

(73) Assignee: JENP-JOU ENTERPRISE CO., LTD., Tainan (TW)

( * ) Notice: Subject to any disclaimer, the term of this patent is extended or adjusted under 35 U.S.C. 154(b) by 0 days.

(21) Appl. No.: 18/173,412

(22) Filed: Feb. 23, 2023

(65) Prior Publication Data

US 2024/0208265 A1    Jun. 27, 2024

(30) Foreign Application Priority Data

Dec. 23, 2022   (TW) .................................. 111214266

(51) Int. Cl.
*B60B 33/00*   (2006.01)
(52) U.S. Cl.
CPC ...... *B60B 33/0086* (2013.01); *B60B 33/0042* (2013.01); *B60B 33/0049* (2013.01); *B60B 33/0057* (2013.01); *B60B 2200/22* (2013.01); *B60B 2900/133* (2013.01); *B60B 2900/50* (2013.01)
(58) Field of Classification Search
CPC ............ B60B 33/0086; B60B 33/0042; B60B 33/0049; B60B 33/0057; B60B 2200/22; B60B 2900/133; B60B 2900/50
See application file for complete search history.

(56) References Cited

U.S. PATENT DOCUMENTS

| 5,368,133 | A | * | 11/1994 | Yang | ................... | B60B 33/0042 |
| | | | | | | 74/483 PB |
| 6,256,835 | B1 | * | 7/2001 | Wang | .................. | B60B 33/0049 |
| | | | | | | 16/35 R |
| 8,991,007 | B2 | * | 3/2015 | Tsai | .................... | B60B 33/0084 |
| | | | | | | 16/35 R |
| 10,099,511 | B2 | * | 10/2018 | Ma | ....................... | B60B 33/0086 |
| 10,759,221 | B1 | * | 9/2020 | Tsai | .................... | B60B 33/0094 |
| 2022/0378635 | A1 | * | 12/2022 | Neihouser | ............ | A61G 7/0528 |
| 2023/0373244 | A1 | * | 11/2023 | Kolar | .................... | B60B 33/021 |

FOREIGN PATENT DOCUMENTS

WO    WO-2023227220 A1 * 11/2023

* cited by examiner

*Primary Examiner* — Christine M Mills
*Assistant Examiner* — Matthew J Sullivan
(74) *Attorney, Agent, or Firm* — MUNCY, GEISSLER, OLDS & LOWE, P.C.

(57) ABSTRACT

A caster includes a caster unit and at least one braking unit. The caster unit includes a receptacle, a wheel shaft disposed through the receptacle, a wheel assembly sleeved on the wheel shaft and rotatable relative to the receptacle, and a spring assembly which acts on the receptacle and the wheel shaft. The receptacle is movable relative to the wheel assembly in a vertical direction. The braking unit includes a surrounding teeth structure formed on the wheel assembly and having a hardness ranging from 65 to 75 on a Shore D scale, and a braking piece mounted on the receptacle. The braking piece includes a braking surface in form of a curve surface having a hardness ranging from 40 to 46 on the Shore D scale to be engaged with the surrounding teeth structure to retard rotation of the wheel assembly.

6 Claims, 8 Drawing Sheets

CASTER WITH A BREAKING UNIT

CROSS-REFERENCE TO RELATED APPLICATION

This application claims priority to Taiwanese Patent Application No. 111214266, filed on Dec. 23, 2022.

FIELD

The disclosure relates to a caster, and more particularly to a caster with a braking unit.

BACKGROUND

Figure 1:
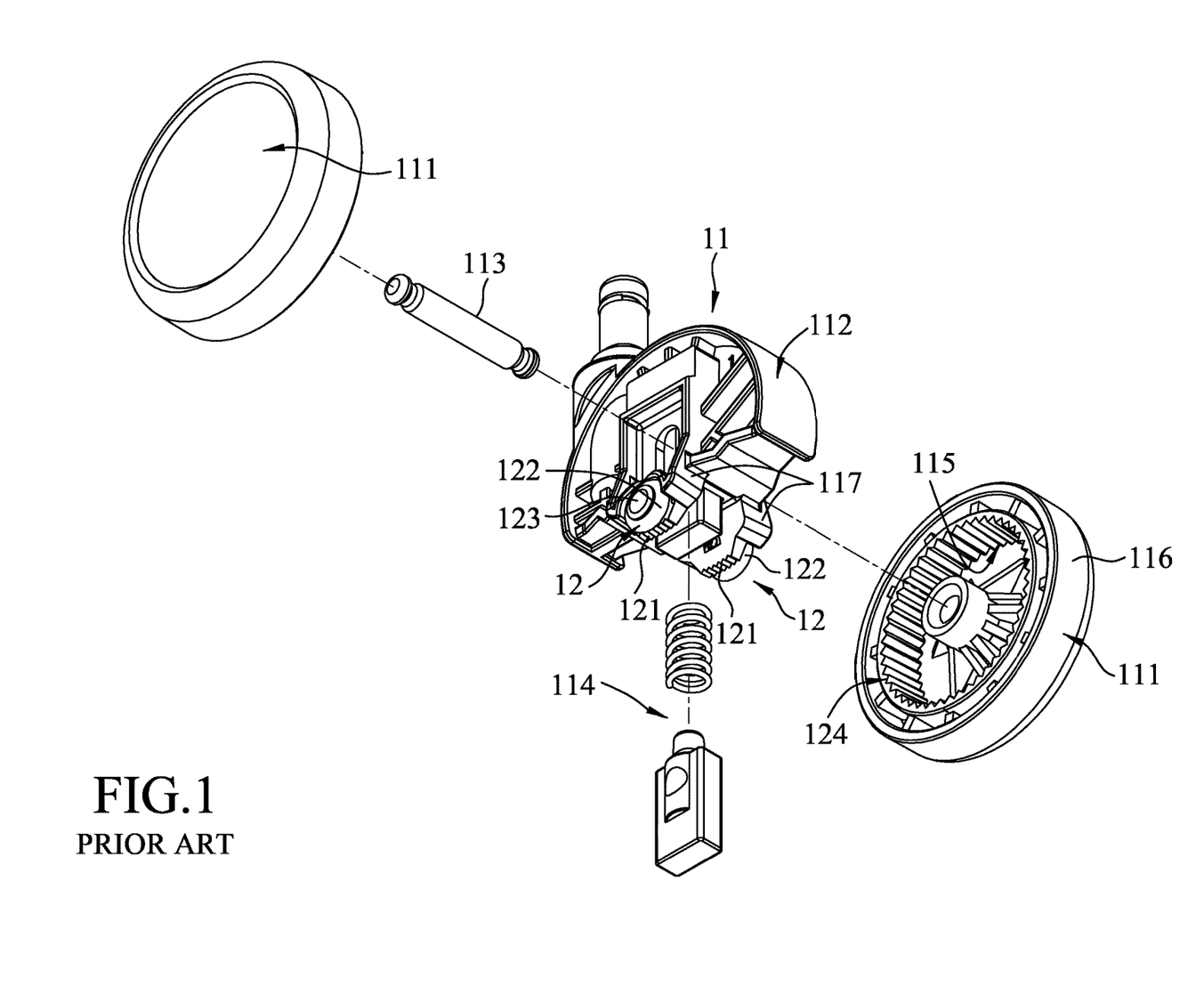
FIG. 1 is an exploded perspective view of a conventional caster.
Figure 2:
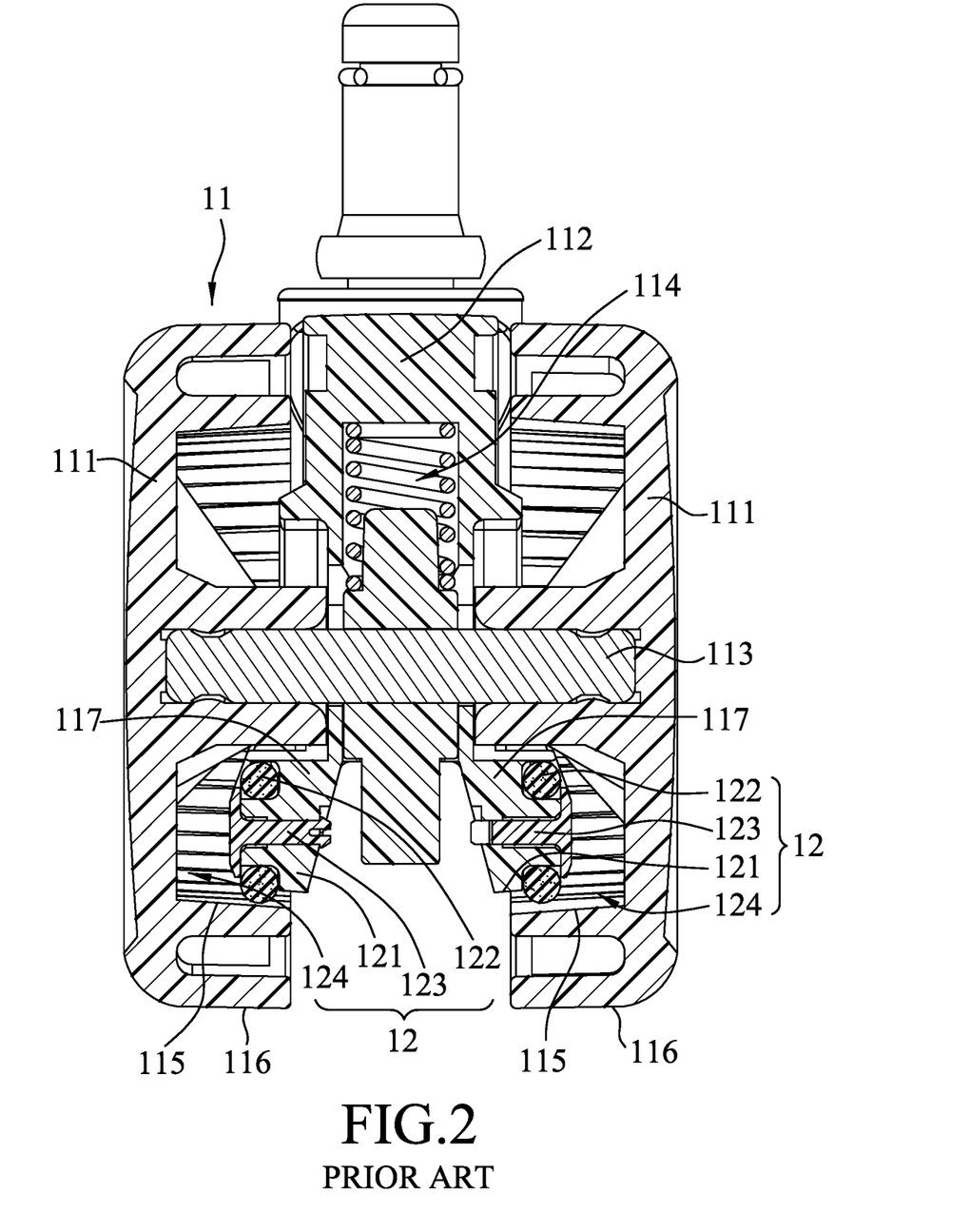
FIG. 2 is a sectional view of the conventional caster.

Referring to FIGS. 1 and 2, a conventional caster as disclosed in TWI 729360 is fitted to each leg of a chair to move the chair on the ground surface, and includes a caster unit 11 and two braking units 12. The caster unit 11 includes two wheels 111 and a receptacle 112 disposed between the wheels 111, a wheel shaft 113 extending axially through the receptacle 112 and having two ends respectively connected with the wheels 111, and a spring assembly 114 acting on the receptacle 112 and the wheel shaft 113. Each wheel 111 has an inner rim surface 115 and an outer rim surface 116 radially and outwardly opposite to each other. The receptacle 112 is movable relative to the wheels 111 in a vertical direction and includes two mount housing portions 117 which are respectively disposed inwardly of the inner rim surfaces 115 of the wheels 111. The spring assembly 114 is compressed when the receptacle 112 is moved downwardly relative to the wheels 111 so as to generate a biasing force for urging the receptacle 112 upward.

Each braking unit 12 includes a straight teeth portion 121 formed at a lower end of the respective mount housing portion 117, a muffling ring 122 sleeved on the mount housing portion 117, an end cap 123 mounted on a lateral end of the mount housing portion 117, and a surrounding teeth structure 124 formed on the inner rim surface 115 of the respective wheel 111.

When a user sits on the chair body, a downward pressure is applied to move the receptacle 112 downward relative to the wheels 111 to make engagement of the teeth portions 121 with the surrounding teeth structures 124 for preventing rotation of the wheels 111 relative to the receptacle 112. Although the muffling ring 122 can reduce noise generated as a result of meshing engagement of the teeth portions 121 with the surrounding teeth structures 124. It is desirable to provide a different design which can avoid noise generation during braking operations.

SUMMARY

Therefore, an object of the disclosure is to provide a caster that has a braking unit different from the prior art and that can prevent noise generation.

According to the disclosure, the caster includes a caster unit and at least one braking unit. The caster unit includes a receptacle, a wheel shaft which extends along an axial direction and which is disposed through the receptacle, a wheel assembly which is sleeved on the wheel shaft and which is rotatable relative to the receptacle, and a spring assembly which acts on the receptacle and the wheel shaft in a vertical direction. The receptacle is movable relative to the wheel assembly in the vertical direction. The spring assembly is compressed as a result of a downward movement of the receptacle relative to the wheel assembly to urge the receptacle upwardly relative to the wheel assembly. The braking unit includes a surrounding teeth structure which is formed on the wheel assembly, and a braking piece which is mounted on the receptacle. The surrounding teeth structure is made of a material which has a hardness ranging from 65 to 75 on a Shore D scale. The braking piece is disposed inwardly of the surrounding teeth structure in a radial direction, and includes a braking surface which faces the surrounding teeth structure. The braking surface is in form of a curve surface free of teeth, and is made of a material which has a hardness ranging from 40 to 46 on a Shore D scale. The braking surface is engaged with and disengaged from the surrounding teeth structure when the receptacle is moved downwardly and upwardly, respectively, and cooperates with the surrounding teeth structure to retard rotation of the wheel assembly relative to the receptacle when being engaged with the surrounding teeth structure.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 3:
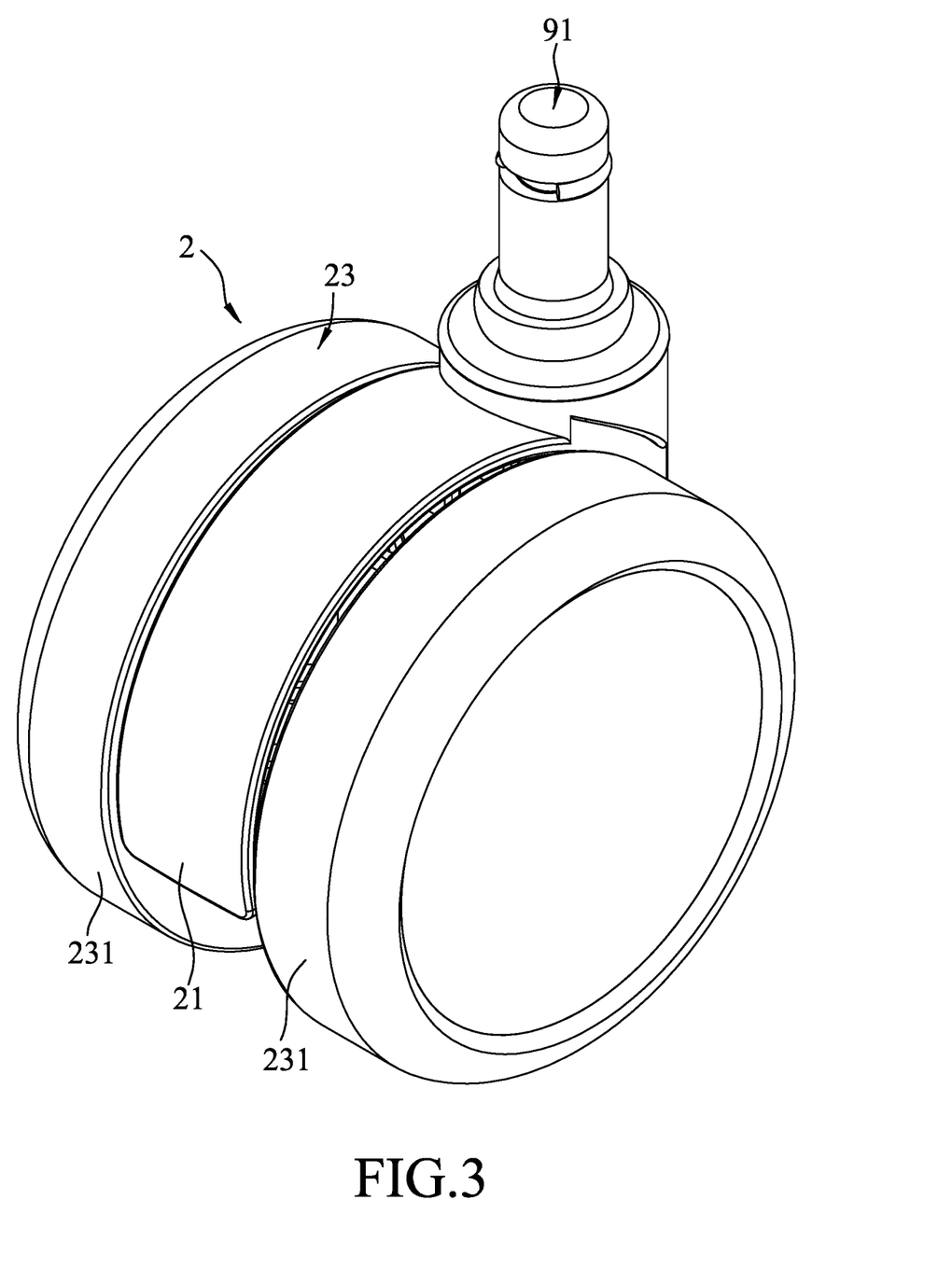
FIG. 3 is a perspective view illustrating an embodiment of a caster according to the disclosure.
Figure 4:
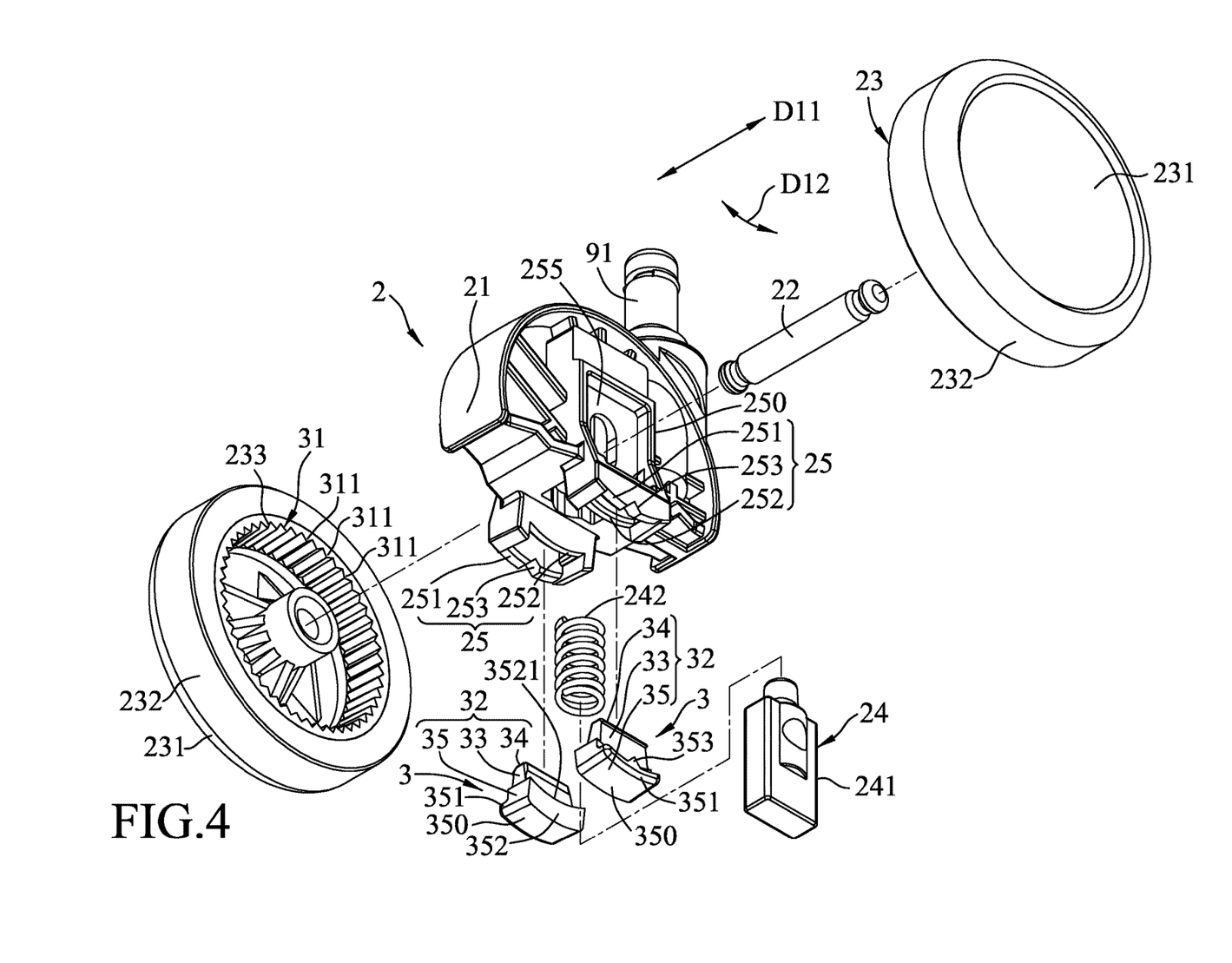
FIG. 4 is an exploded perspective view of the embodiment.
Figure 5:
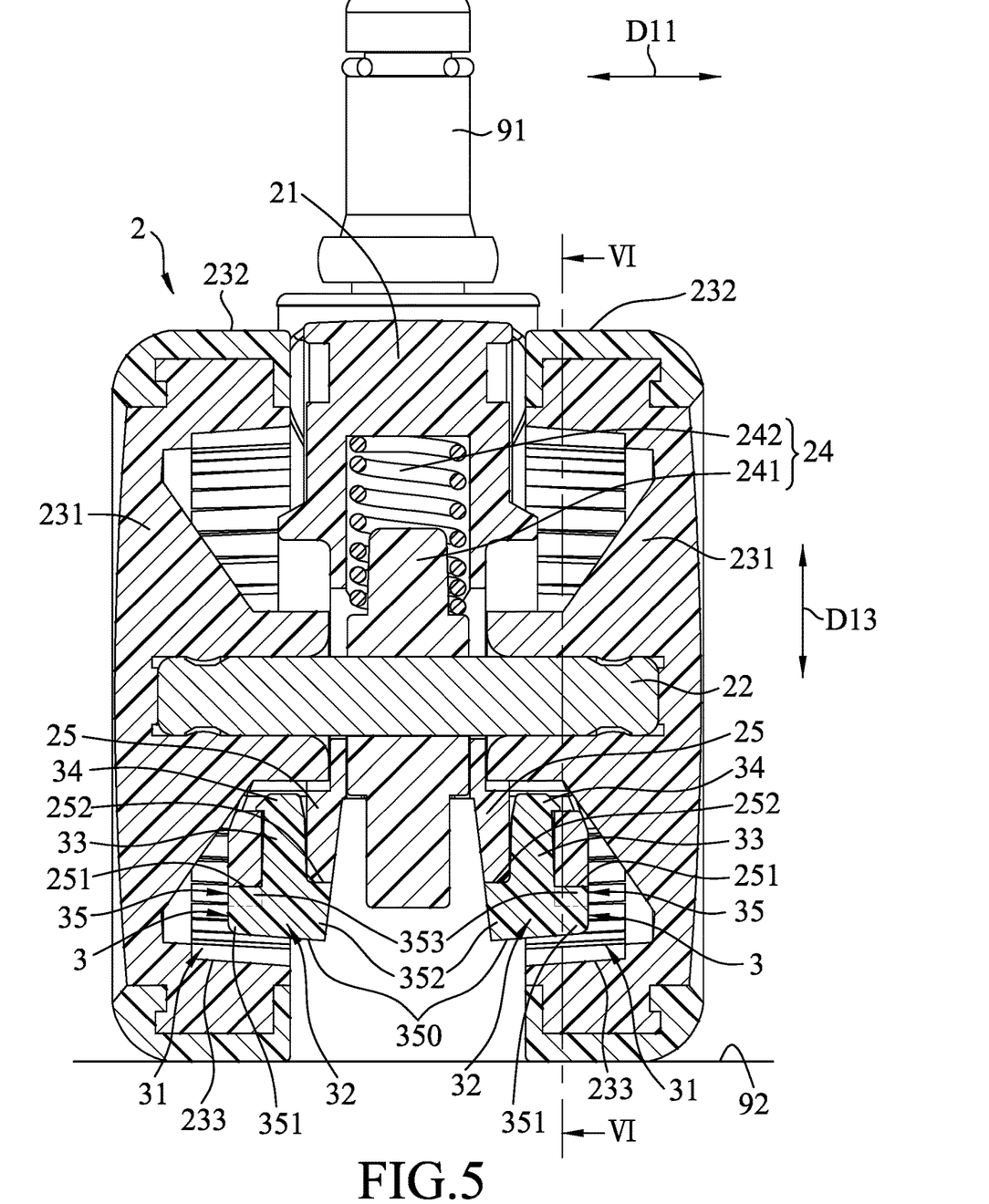
FIG. 5 is a sectional view illustrating the embodiment in a movable state.

Referring to FIGS. 3, 4 and 5, an embodiment of a caster according to the disclosure is fitted to a piece of furniture, such as a chair through a mounting shaft 91, and includes a caster unit 2 and two braking units 3.

Figure 6:
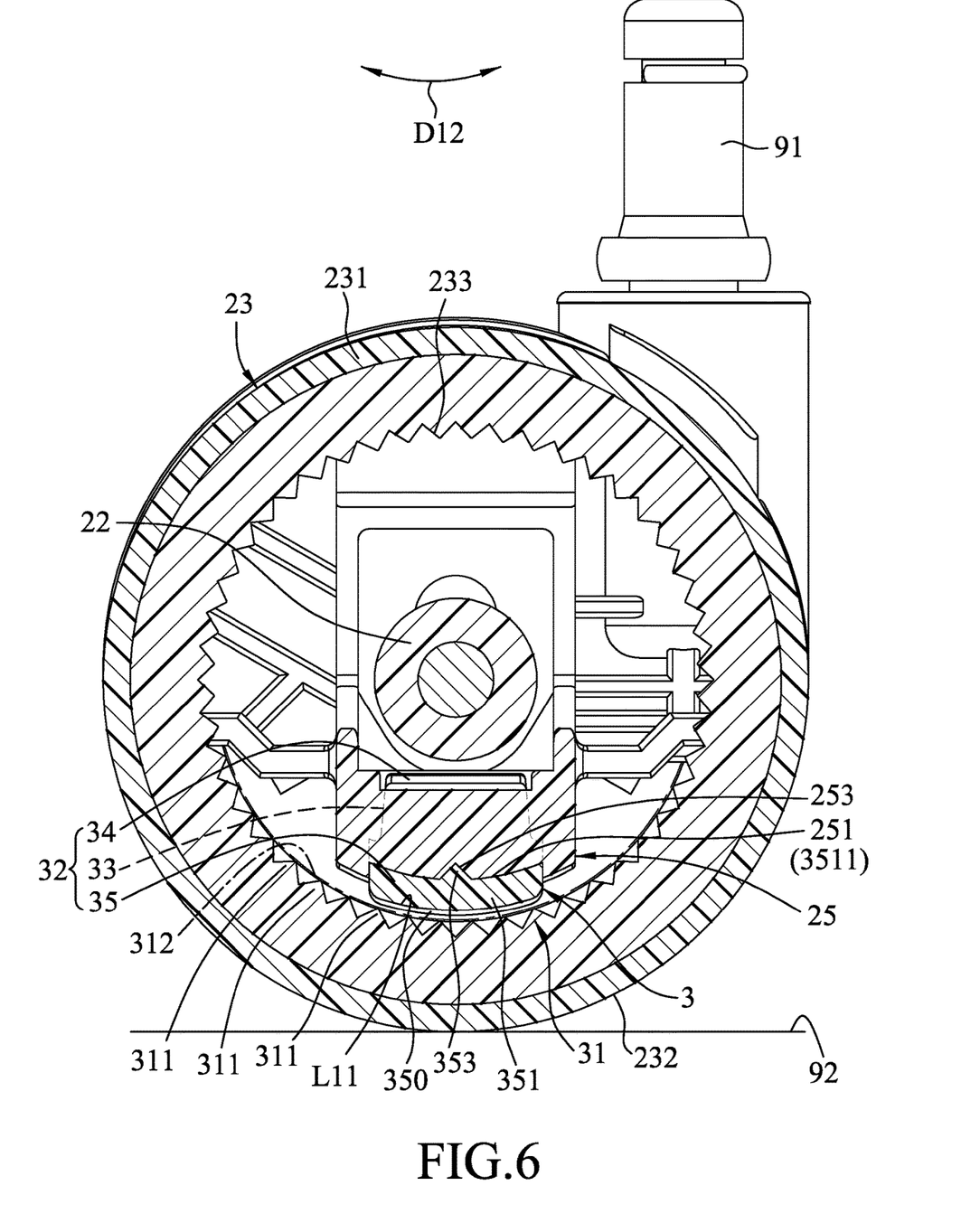
FIG. 6 is a cross-sectional view taken from line VI-VI of FIG. 5.

With reference to FIGS. 4, 5 and 6, the caster unit 2 includes a receptacle 21, a wheel shaft 22 which extends along an axial direction (D11) (i.e., a left-right direction) and which is loosely engaged and is disposed through the receptacle 21, a wheel assembly 23 which is sleeved on the wheel shaft 22 and which is rotatable relative to the receptacle 21, and a spring assembly 24 which acts on the receptacle 21 and the wheel shaft 22 in a vertical direction.

The receptacle 21 is mounted below and connected with a chair leg through the mounting shaft 91 in a known manner. The receptacle 21 is movable relative to the wheel assembly 23 in the vertical direction, and includes two mount housing portions 25 which project in the axial direction (D11). Each mount housing portion 25 has a rectangular surrounding wall 250 to define a housing space 255. The surrounding wall 250 includes a first wall edge 251 and a second wall edge 252 which are formed at a lower end of the surrounding wall 250 and which are spaced apart from each other in the axial direction (D11). Each of the first and second wall edges 251, 252 extends in an arcuate direction (D12). The first wall edge 251 is formed with a notch 253 which is tapered upwardly and in the form of a sector.

The wheel assembly 23 includes two wheels 231 which are respectively mounted on two ends of the wheel shaft 22 and outboard of two sides of the receptacle 21 in the axial direction (D11) (i.e., left and right sides of the receptacle 21). Each wheel 231 includes an outer rim surface 232 for contacting the ground surface 92, and an inner rim surface 233 inwardly of the outer rim surface 232 in a radial direction (D13). The mount housing portions 25 are disposed inwardly of the inner rim surfaces 232 of the wheels 231, respectively.

The spring assembly 24 includes a support piece 241 which is sleeved on the wheel shaft 22 and is disposed in the receptacle 21, and a biasing piece 242 which is connected between the support piece 241 and the receptacle 21. The biasing piece 242 is a compression spring which is compressed as a result of a downward movement of the receptacle 21 relative to the wheel assembly 23 to urge the receptacle 21 upwardly relative to the wheel assembly 23.

Each braking unit 3 includes a surrounding teeth structure 31 which is formed on the inner rim surface 233 of the respective wheel 231, and a braking piece 32 which is mounted within the respective mount housing portion 25 of the receptacle 21.

Each surrounding teeth structure 31 is made of a nylon material which has a hardness ranging from 65 to 75 on a Shore durometer type D scale, and includes a plurality of teeth 311 which are arranged along the arcuate direction (D12) and cooperatively define an inner teeth rim 312. In this embodiment, each surrounding teeth structure 31 is made of nylon material having a hardness of 70 on the Shore D scale. Each braking piece 32 is made of a material which has a hardness ranging from 40 to 46 on the Shore D scale, such as polyurethane having a hardness of 43 on the Shore D scale.

Each braking piece 32 is disposed inwardly of the corresponding surrounding teeth structure 31 in the radial direction (D13), and includes an insert portion 33 which is inserted upwardly into the housing space 255 of the corresponding mount housing portion 25, a barb portion 34 which is integrally formed with and extends upwardly from the insert portion 33, and a braking portion 35 which is integrally formed with and extends downwardly from the insert portion 33 and outwardly of the corresponding mount housing portion 25. The insert portion 33 is rectangular. The barb portion 34 is retained on an upper end of the surrounding wall 250 of the corresponding mount housing portion 25. The braking portion 35 has a braking surface 350 at a bottom end thereof and facing the corresponding surrounding teeth structure 31. The braking surface 350 is in the form of a curved surface without teeth, and extends along the arcuate direction (D12). The braking portion 35 further includes a first engaging protrusion 351 and a second engaging protrusion 352 which project in the axial direction (D11) from the insert portion 33 and away from each other.

The braking surface 350 is formed as a part of the braking piece 32 so as to have a hardness of 43 on the Shore D scale. The braking surface 350 extends in the arcuate direction (D12), and intersects a plane sectioned in the radial direction (D13) at an arcuate line (L11). The curvature of the inner teeth rim 312 is the same as the arcuate line (L11).

The first engaging protrusion 351 extends along the arcuate direction (D12), and has a first upper edge section 3511 which abuts against and is engaged with the corresponding first wall edge 251. The first upper edge section 3511 of the first engaging protrusion 351 has a protuberance 353 projecting in the radial direction (D13) to be inserted upwardly into the notch 253 of the first wall edge 251. The protuberance 353 is in the form of a sector so as to be fitted to the notch 253. The second engaging protrusion 352 extends along the arcuate direction (D12), and has a second upper edge section 3521 which abuts against and is engaged with the corresponding second wall edge 252.

Figure 7:
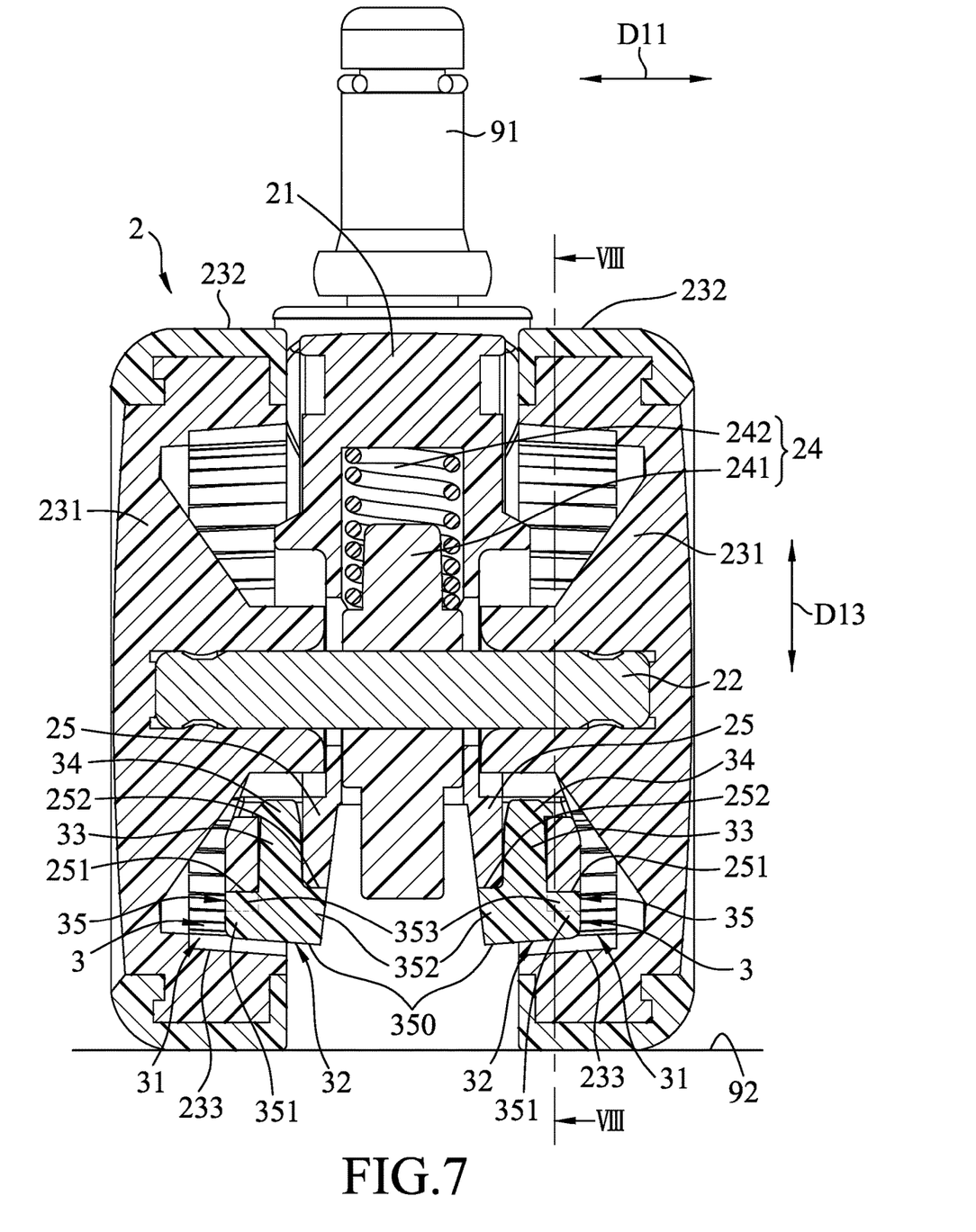
FIG. 7 is a sectional view similar to FIG. 5, illustrating the embodiment in an unmoved state.
Figure 8:
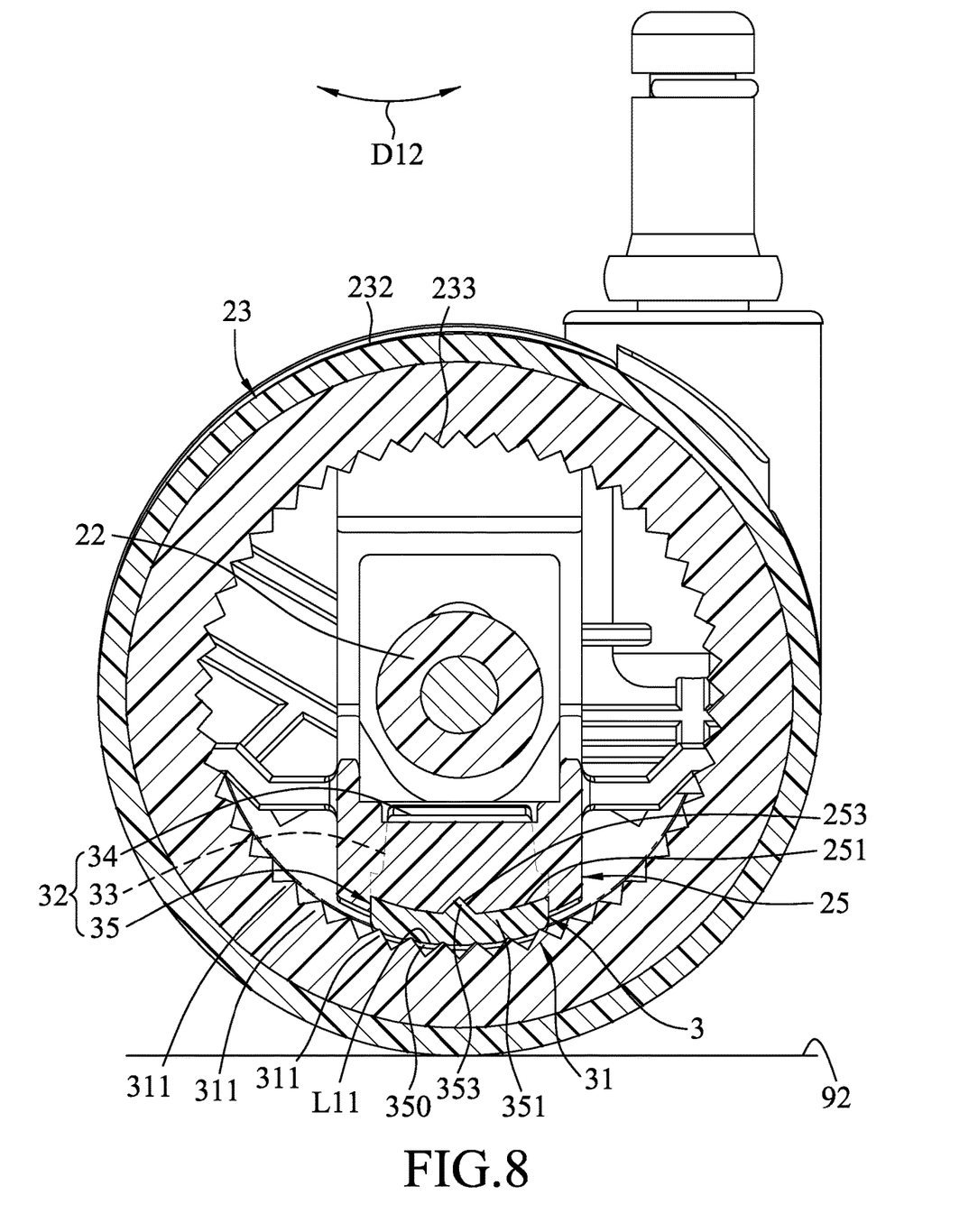
FIG. 8 is a cross-sectional view taken from line VIII-VIII of FIG. 7.

With reference to FIGS. 5 to 8, the caster of the embodiment is shiftable between a movable state (see FIGS. 5 and 6) and an unmoved state (see FIGS. 7 and 8). In the movable state, the biasing piece 242 urges the receptacle 21 upwardly so as to keep the braking surfaces 350 of the braking pieces 32 to disengage and be spaced apart from the surrounding teeth structures 31. In this state, the wheels 231 are rotatable relative to the receptacle 21 so as to move the chair.

When a user sits on the chair, a downward pressure is transmitted to the receptacle 21 through the mounting shaft 91 to move the receptacle 21 downwardly relative to the wheels 231 and compress the biasing pieces 242. The braking pieces 32 are moved downwardly to abut against and be engaged with the surrounding teeth structures 31 so as to be shifted to the unmoved state. With reference to FIGS. 4, 7 and 8, in the unmoved state, each braking surface 350 abuts against and is engaged with the teeth 311 of the corresponding surrounding teeth structure 31. At this stage, with the weight of the user, and the braking surfaces 350 having the hardness smaller than that of the teeth 311 of the surrounding teeth structures 31, the braking surfaces 350 are slightly deformed such that the teeth 311 of each surrounding teeth structure 31 are slightly engaged in the corresponding braking surface 350, as shown in FIG. 8 so as to be retained unmoved by the braking surface 350. As such, the braking surfaces 350 cooperate with the surrounding teeth structures 31 to retard rotation of the wheels 231 of the wheel assembly 23 relative to the receptacle 21 to prevent movement of the chair.

When the user leaves the chair and the downward pressure is relieved, the receptacle 21 is urged upwardly by the biasing piece 242 to permit the braking surfaces 350 to be disengaged from the surrounding teeth structures 31 so as to shift the caster to the movable state of FIGS. 5 and 6.

Since the braking surfaces 350 are in the form of a curve surface free of teeth, generation of striking noise when the braking surfaces 350 are moved to abut against and engaged with the surrounding teeth structures 31 is minimized. Moreover, with the braking surfaces 350 and the surrounding teeth structures 31 having appropriate hardness, the braking surfaces 350 are slightly deformed for retainingly engaging the surrounding teeth structures 31 so as to provide a meshing engagement therebetween as a toothed structure.

The curvature of each inner teeth rim 312 (i.e. the curvature of a line connecting edges of the teeth) is the same as the arcuate line (L11) of the braking surface 350, which facilitates the engagement of the teeth 311 with the braking surfaces 350 so as to optimize the braking effect. Moreover, each of the first wall edges 251, the second wall edges 252, the first engaging protrusions 351 and the second engaging protrusions 352 extends in the arcuate direction (D12) so as to facilitate mating engagement therebetween. Furthermore, with the protuberance 353 of each first engaging protrusion 351 being engageable into the notch 253 of the corresponding first wall edge 251, alignment instruction is provided during fabrication of the caster, and movement of the braking pieces 32 relative to the mount housing portions 25 in the arcuate direction (D12) is prevented.

As illustrated, with the braking surfaces 350 and the surrounding teeth structures 31 having appropriate hardness, and with the braking surfaces 350 in the form of a curved surface without teeth, a new caster with a different braking structure from the prior art is provided which can prevent generation of noise during the braking operation.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A caster comprising:
    a caster unit including a receptacle, a wheel shaft which extends along an axial direction and which is disposed through said receptacle, a wheel assembly which is sleeved on said wheel shaft and which is rotatable relative to said receptacle, and a spring assembly which acts on said receptacle and said wheel shaft in a vertical direction, said wheel assembly including two wheels which are respectively mounted on two ends of said wheel shaft and outboard of two sides of said receptacle in the axial direction, each of said wheels including an outer rim surface and an inner rim surface inwardly of said outer rim surface in a radial direction, said receptacle being movable relative to said wheel assembly in the vertical direction, said spring assembly being compressed as a result of a downward movement of said receptacle relative to said wheel assembly to urge said receptacle upwardly relative to said wheel assembly; and
    two braking units, each including a surrounding teeth structure which is formed on said inner rim surface of a respective one of said wheels, and a braking piece which is mounted on said receptacle, said surrounding teeth structure being made of a material which has a hardness ranging from 65 to 75 on a Shore D scale, said braking piece being disposed inwardly of said inner rim surface of said respective wheel in the radial direction, and including a braking surface which faces said surrounding teeth structure, said braking surface being in form of a curved surface without teeth, and being made of a material which has a hardness ranging from 40 to 46 on the Shore D scale, said braking surface being engaged with and disengaged from said surrounding teeth structure when said receptacle is moved downwardly and upwardly, respectively, and cooperating with said surrounding teeth structure to retard rotation of said wheel assembly relative to said receptacle when being engaged with said surrounding teeth structure,
    wherein said receptacle includes two mount housing portions which project in the axial direction and which are disposed inwardly of said inner rim surfaces of said wheels, respectively, said braking pieces of said braking units being respectively disposed within said mount housing portions, each of said braking pieces including an insert portion which is inserted into a respective one of said mount housing portion, and a braking portion which extends downwardly from said insert portion and outwardly of said respective mount housing portion, said braking portion of each of said braking pieces having said braking surface at a bottom end thereof and facing said surrounding teeth structure, and
    wherein each of said mount housing portions has a surrounding wall to define a housing space for insertion of and receiving said insert portion of a respective one of said braking pieces, said surrounding wall including a first wall edge and a second wall edge which are formed at a lower end of said surrounding wall and which are spaced apart from each other in the axial direction, each of said first and second wall edges extending in an arcuate direction, said braking portion of each of said braking pieces including a first engaging protrusion and a second engaging protrusion which project in the axial direction from said insert portion and away from each other, said first engaging protrusion having a first upper edge section which abuts against and is engaged with said first wall edge, said second engaging protrusion having a second upper edge section which abuts against and is engaged with said second wall edge.

2. The caster of claim 1, wherein one of said first engaging protrusion and said first wall edge has a protuberance projecting in a radial direction to be inserted into the other one of said first engaging protrusion and said first wall edge in the radial direction.

3. The caster of claim 2, wherein said protuberance is in form of a sector.

4. The caster of claim 1, wherein each of said braking pieces further includes a barb portion which extends upwardly from said insert portion and which is retained on an upper end of said surrounding wall of a respective one of said mount housing portions.

5. The caster of claim 1, wherein said braking surface of each of said braking pieces extends in an arcuate direction, and intersects a plane sectioned in the radial direction at an arcuate line.

6. The caster of claim 5, wherein said surrounding teeth structure of each of said braking units includes a plurality of teeth which are arranged along the arcuate direction and cooperatively define an inner teeth rim, a curvature of said inner teeth rim being the same as said arcuate line.

* * * * *